Feb. 28, 1967 B. F. W. HEYER Re. 26,163

ENGINE PARAMETER ANALYZER

Original Filed March 11, 1958 3 Sheets-Sheet 1

INVENTOR

Benjamin F. W. Heyer,

BY J. Gibson Gemmes

ATTORNEY

ENGINE PARAMETER ANALYZER

Original Filed March 11, 1958 3 Sheets-Sheet 2

INVENTOR
Benjamin F. W. Heyer,
BY J. Gibson Semmes
ATTORNEY

INVENTOR

Benjamin F. W. Heyer,

BY J. Gibson Semmes

ATTORNEY

United States Patent Office

Re. 26,163
Reissued Feb. 28, 1967

26,163
ENGINE PARAMETER ANALYZER

Benjamin F. W. Heyer, Greenwich, Conn., by The Marquette Corporation of Golden Valley, Minn., a corporation of Delaware, assignee, assignor to Marquette Corporation, a corporation of Delaware Original No. 2,986,032, dated May 30, 1961, Ser. No. 720,688, Mar. 11, 1958. Application for reissue Aug. 12, 1965, Ser. No. 480,836
18 Claims. (Cl. 73—116)

Matter enclosed in heavy brackets [ ] appears in the original patent but forms no part of this reissue specification; matter printed in italics indicates the additions made by reissue.

My invention relates to a combustion engine analyzing system, and more particularly to method and apparatus for electronically determining the relative contribution of each cylinder to overall performance of an engine.

In accordance with the present invention, a disabling action, is derived from the engine at a rate proportional to the speed of the engine crankshaft and in a definite phase relation thereto, this disabling action being used to cause by electronic means any desired cylinder or cylinders of the engine to become inoperative. By selectively rendering any desired cylinder inoperative while the engine is still running, and without affecting the operation of the other cylinders, an analysis of the resulting engine performance enables ready determination of the contribution of a particular cylinder. This analysis reflects either individually, or as compared to other cylinders of the engine, mechanical operating conditions within the cylinders, heretofore obtainable in crude fashion only, with the time consuming and unwieldy compression test and/or mechanical or manual ignition shorting devices.

[Another] *An* object of my invention is to provide an improved method of determining the relative contribution of each cylinder to overall performance of a combustion engine, by selectively rendering any desired cylinder *effectively* inoperative through electronic means while the engine is running, and thereafterwards analyzing the resulting engine performance whereby the said contribution of a particular cylinder as compared to other cylinders is readily determined at a glance.

Yet another object of my invention is to provide an improved method of determining the relative contribution of each cylinder to overall performance of a combustion engine, by selectively disabling electronically the cylinders one or more at a time, simultaneously measuring the change in [the engine parameters, i.e., performance output including:] *an engine parameter such as* speed, vacuum, etc., as each of the cylinders is disabled, and then identifying such measurement with the specific cylinder or cylinders so disabled.

Still another object of my invention is to provide an improved combustion engine analyzing system wherein a trigger pulse is derived from *one spark plug of* the engine in such manner that the impulses occur at a rate proportional to engine r.p.m., said impulses being used directly or in combination with either electronic time delay measurement, electronic phase measurement, or an electronic engine events counting system to cause any desired cylinder or cylinders to become inoperative.

A further object of my invention is to provide improved combustion engine analyzing systems for determining the contribution of each cylinder to overall performance of the engine wherein any desired cylinder is selectively rendered inoperative while the engine is running, by preventing ignition in one or more cylinders through electronic means, the cylinders being selected by electronic time measurement, electronic numerical counting, or electronic phase measurement from the beginning of a complete engine cycle to the position of the disabled cylinder or cylinders to be disabled in the firing order of the engine.

Yet a further object of my invention is to provide an improved internal combustion engine analyzer constructed and arranged whereby an analysis of the mechanical condition of an engine can be accomplished in a matter of a few minutes, and without the necessity of physically sorting out spark plugs either at the distributor cap or at the plugs and avoiding the necessity of attaching mechanism or mechanical appurtenances such as adaptors, cams, shafts or complete transmisison systems for recording instruments.

With these and other objects in view, which may be incident to my improvements, the invention consists in the parts and combinations to be hereinafter set forth and claimed, with the understanding that the several necessary elements, comprising my invention, may be varied in construction, proportions and arrangement, without departing from the spirit and scope of the appended claims.

By way of clarification the following definitions prevail in the ensuing description:

(a) "Complete engine cycle" is: All engine events occurring from the ignition of a given cylinder until just preceding the next succeeding ignition of said given cylinder.

(b) "Phase" is the relation in angular degrees between engine crank shaft position and ignition events selected for disabling.

(c) "Disabling device" herein shall include a device which renders the ignition of a given cylinder or cylinders inoperative.

(d) "Time" herein shall be the elapsed time between the commencement of a complete engine cycle and the occurrence of the ignition event selected for disabling.

(e) "Count is [in] the number of ignition events occurring between commencement of a complete engine cycle and the ignition event selected for disabling.

(f) "Electronic" or "electronically," as used herein, shall be defined as embracing devices in the art which have as components thereof either electron tubes or solid state devices, performing similar functions as electron tubes.

In order to make my invention more clearly understood, I have shown in the accompanying drawings [a] means for carrying the same into practical effect, without limiting the improvements in their useful applications to the particular constructions, which, for the purpose of explanation, have been made the subject of illustration.

Figure 1:
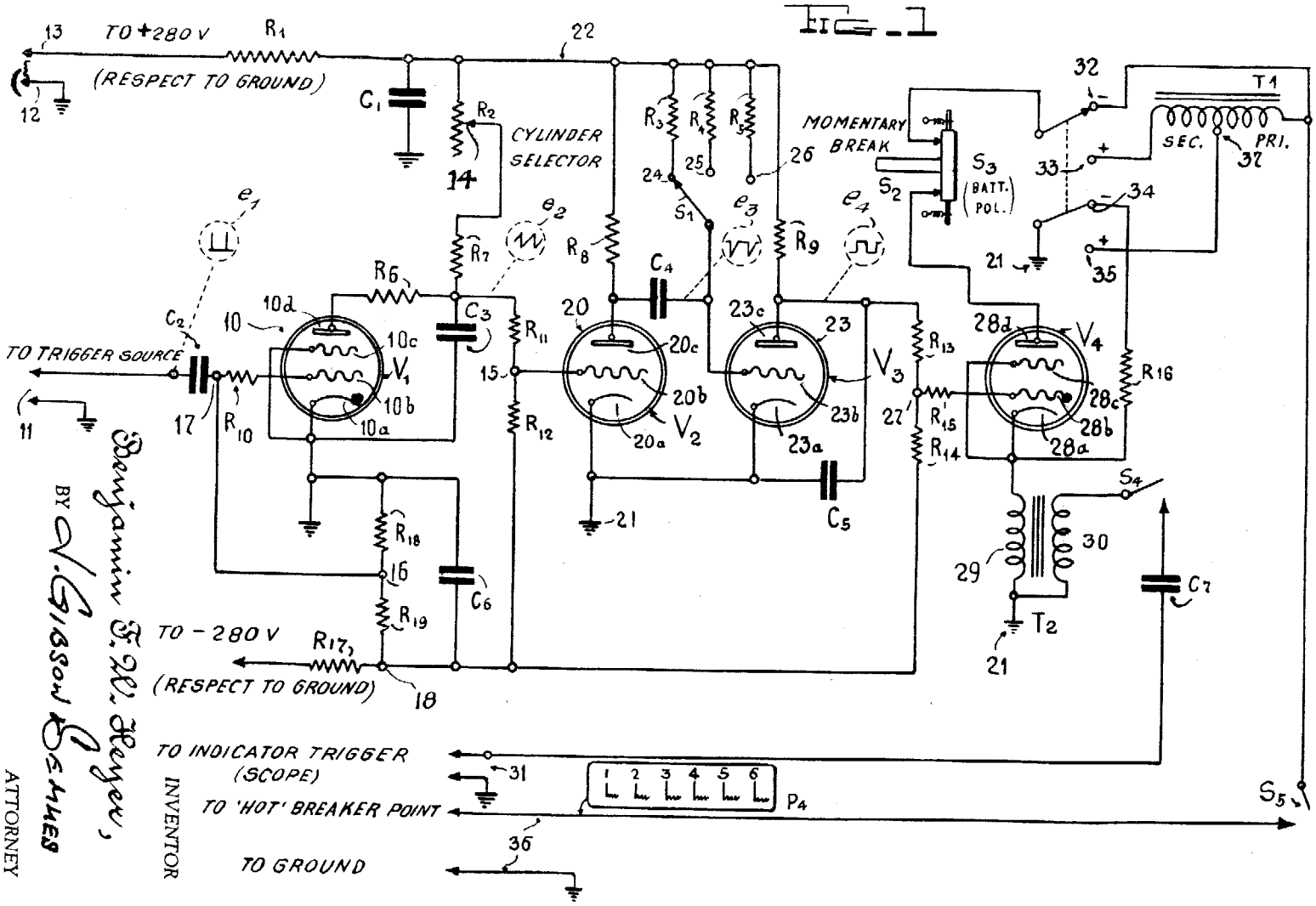
FIGURE 1 illustrates one embodiment of the present invention, the arrangement of the components and associated circuits being shown schematically.

Referring to the drawings, and more particularly to FIG. 1, there is shown one embodiment of the present invention wherein an electrical pulse is derived from the high tension ignition pulse to a spark plug of a combustion engine cylinder 1, which pulse activates the time delay circuit with a selectable delay, as will be described more fully hereinafter. Activation of the time delay circuit causes a thyratron $V_4$ to become conductive to any suitable applied positive pulse for a short length of time, at a selectable time after occurrence of the No. 1 cylinder ignition pulse. By making the selectable time delay equal to approximately the time between normal firing time of this cylinder and another cylinder N, not shown, the thyratron $V_4$ is made conductive at the firing time of cylinder N, and of cylinder N only, and means are provided whereby the conducting thyratron disables the ignition of said cylinder, thereby rendering it inoperative. This is accomplished by shunting the breaker points in the ignition [coil] *system* by the thyratron. When the points are open, the thyratron conducts, [instead of the points,] thereby preventing rapid change of magnetic flux in the ignition coil [.] *and consequent firing of the spark plug.*

It will thus be seen that any desired cylinder, except No. 1 can be disabled. To disable this cylinder by setting the time delay to zero is not a solution since an ignition pulse must be present in order to initiate the time delay circuit. Setting the time delay equal to one complete engine cycle causes only even occurrences, that is to say, 2nd, 4th, 6th, etc. [having no previous initiation pulses.] *This is obviously the case since the pulse from No. 1 plug can, if the time delay is set to equal one complete engine cycle, cause No. 1 plug to be disabled on the second cycle. Due to the disabling of the plug, however, this pulse would not be available to disable the plug on the third cycle. Since the No. 1 plug would again be operative, it would be available one cycle later to disable the plug on the fourth cycle, etc.*

In order to permit cylinder No. 1 to be shorted on all [fittings] *firings,* a special pulse generating circuit is employed in the cathode circuit of the shorting thyratron to generate a trigger pulse each time cylinder 1 is shorted, thus taking the place of the pulse ordinarily derived from the high tension lead of the cylinder, and allowing the time delay circuit to be self-triggering. This self-triggering pulse can also be used to synchronize oscilloscopes or other auxiliary equipment such as tachometers, timing lights, and the like, which will stay in synchronism with the engine even though the normal synchronized pulse from the high tension lead is no longer present. For ignition systems having the "hot" breaker point negative with respect to ground, for example, those with the plus terminal of the battery grounded, a suitable transformer is used to reverse the polarity so that a positive pulse is applied to the thyratron plate.

Reference again being had to FIG. 1, the thyratron $V_1$, which controls the cycle of operations, includes a cathode 10a, a control grid 10b, a shield grid 10c, and anode 10d contained within an envelope 10. The control grid and cathode are connected through an input system to a trigger source such as the ignition circuit of a combustion engine connected at terminals 11 through condenser $C_2$ and resistor $R_{10}$. The output system of the thyratron $V_1$ is powered from a direct current source connected to terminals 12 *and 13, terminal 12 being at ground potential and* [where] the positive side of the source which may be 280 volts, e.g., [connects] *being connected* to terminal 13 leading through resistance $R_1$ and a shunt path to ground containing condenser $C_1$ and constituting a distributing path for potential to the anodes of the several tubes embodied in the circuit. The anode potential is supplied to plate 10d of the thyratron $V_1$ through the adjustable resistors $R_2$ where adjustable tap *14* movable thereover connects through resistance $R_7$ to the plate circuit of thyratron $V_1$ and through resistance $R_6$ to the plate 10d, and a condenser $C_3$ is connected between anode 10d and cathode 10a, *which, as shown, is at ground potential.*

The output circuit of the thyratron $V_1$ contains a series path which includes a pair of resistances $R_{11}$ and $R_{12}$ having [a mid-tap] *an intermediate tap* 15 therebetween and connected in a series through another pair of resistances $R_{18}$ and $R_{19}$, having a mid-tap 16 therebetween. The end of resistance $R_{11}$ connects with plate 10d through resistance $R_6$ while the end of resistance $R_{18}$ connects with the cathode 10a of the thyratron $V_1$. The resistances $R_{18}$ and $R_{19}$ are shunted by a condenser $C_6$, and constitutes part of the voltage divider system for rendering the thyratron $V_1$ nonconductive. The mid-tap 16 connects to a point 17 intermediate condenser $C_2$ and resistance $R_{10}$ in the input circuit of the thyratron. *The direct current source connected to terminals 12 and 13 also has a further terminal connected to a point negative with respect to ground.* [The] *This* negative side of the voltage source [connected to terminals 12], *which may be at −280 volts as shown in the drawing,* connects through the resistance $R_{17}$ to the point 18 intermediate the two sets of series connected resistances $R_{11}$–$R_{12}$ and $R_{18}$–$R_{19}$. The resistances $R_{11}$–$R_{12}$ serve as a network for biasing the control grid 20b of the high MU tube $V_2$ which contains cathode 20a, the control grid 20b and the plate 20c *within an envelope 20.* The input circuit to high MU tube [20] $V_2$ connects between tap 15 [and] between resistances $R_{11}$ and $R_{12}$ and ground indicated at 21, and the plate potential for tube [20] $V_2$ is supplied from the positive distributor bus 22 through resistance $R_8$. The output circuit of high MU tube [20] $V_2$ connects through condenser $C_4$ to the control grid 23b of the cascaded high MU tube [23] $V_3$ *housed within an envelope 23* containing cathode 23a connected to ground 21 and anode 23c connected through resistance $R_9$ to the positive distributor bus 22. The input circuit of high MU tube [23] $V_3$ has the bias thereon controlled through a selector, [for the number of cylinders of the engine to be] *which is adjusted in accordance with the test conditions such as the number of cylinders in the engine being* tested, comprising a switch $S_1$ operative over contacts 24, 25, and 26 for selectively including resistances $R_3$, $R_4$, or $R_5$, in circuit between the positive distributor bus 22 and control grid 23b of high MU tube [23] $V_3$.

The switch $S_1$ permits the selection of *the* time period over which the thyratron $V_4$ can conduct. In the case of a four-cylinder engine, this time period can be made, e.g., twice as long as for eight-cylinder engines, thus requiring no change of adjustment of resistance $R_2$ for greater change in revolutions per minute of four-cylinder engines as compared to eight-cylinder engines. The output of high MU tube [23] $V_3$ is bridged by a condenser $C_5$, and includes a pair of resistances $R_{13}$ and $R_{14}$ connected in series with a mid-tap 27 therebetween and connected between the plate 23c and the negative side of the high potential source connected to terminals 12. The resistances $R_{13}$–$R_{14}$ serve as a voltage divider for the control grid of a thyratron $V_4$ through a resistance $R_{15}$.

The thyratron $V_4$ includes cathode 28a, control grid 28b, shield grid 28c, and anode 28d, within an envelope 28. The [input] *cathode* circuit to thyratron $V_4$ is completed through the primary winding 29 of transformer $T_2$ which connects to ground 21[, the input circuit including]. *The grid circuit of thyratron $V_4$ includes* resistance $R_{15}$ connected to tap 27 in the voltage divider circuit $R_{13}$–$R_{14}$. Transformer $T_2$ includes a secondary winding 30 connected to ground at one end and connected at the other end through a switch $S_4$ for opening and closing the circuit through condenser $C_7$ leading to the indicator trigger of the oscilloscope connected to output terminals 31. When the switch $S_4$ is closed, the self-generated trigger pulse can thus be used to cause thyratron $V_4$ to conduct on both even and odd cylinder No. 1 firings, *since the pulse applied to the indicator trigger of the oscilloscope, by reason of the conventional interconnections between the oscilloscope and the ignition circuit connected at terminals 11, causes the self-generated trigger pulse to be applied to the input of tube $V_1$ to produce a pulse during the cycle that the No. 1 plug is disabled. Thus, although the No. 1 plug is disabled, the pulse generated in secondary 30 causes thyratron $V_4$ to conduct one engine cycle later, thereby insuring that the thyratron $V_4$ fires each cycle.*

The output circuit of the thyratron $V_4$ extends from anode 28d through a momentary break switch $S_2$ and to the polarity selector $S_3$ [which]. *The momentary break*

*switch $S_2$ is employed to disable the thyratron $V_4$ when it is desired to temporarily observe engine operation under normal conditions with all cylinders firing. The polarity selector $S_3$* permits operations with either polarity at the breaker points of the engine, thus enabling the analyzer to meet different conditions encountered in the testing of engines of different makes. The polarity selector $S_3$ is operative over selector contacts 32, 33, *34*, and 35. Contact 32 connects through switch $S_5$ in the circuit to the "hot" breaker points connected to terminals 36. Contact 33 connects through auto-transformer $T_1$, including primary and secondary windings in series with a tap 37 therebetween. Contact 34 connects to one end of resistance $R_{16}$ which connects through the primary winding 29 of transformer $T_2$ to ground 21 for effectively shunting the said primary winding whereby the breaker points with "hot" point positive are effectively shorted or shunted by connecting them directly in parallel with a series combination of thyratron $V_4$ and the primary transformer $T_2$ in parallel with resistance $R_{16}$, *the thyratron anode voltage being the voltage across the breaker points at the instant they open.*

Contact 35 connects to tap 37 in the auto-transformer $T_1$. For breaker points with "hot" point negative, the points are shunted by connecting them in parallel with the primary of auto-transformer $T_1$, the secondary of which is shunted by a series combination of thyratron $V_4$ and the primary winding of transformer $T_2$ and transformer $T_1$ thus reversing phase *of the applied anode voltage. Thus a positive voltage is applied to the anode even though the breaker point voltage is negative with respect to ground.* Transformer $T_1$ has sufficient primary inductance to offer only small "loading," with respect to the points, when the thyratron is non-conducting, and yet has sufficiently low resistance and coupling to heavily shunt the points when the thyratron is conducting. The transformer $T_2$ has a primary winding 29 which is of very low inductance and resistance, thus offering only a very small series impedance.

The *selective shunting of* breaker points indicated at 36 permits an analysis to be made of all the cylinders of the engine which I have indicated at $P_4$ by reference symbols 1–6, *for example.*

[In the operation of the analyzer of my invention, a suitable trigger pulse derived from the high tension lead of #1 cylinder, e.g., is applied to the grid 10b of the thyratron $V_1$ through terminals 11 for a time which renders thyratron $V_1$ conductive until condenser $C_3$ is discharged. The thyratron $V_1$ is normally biased so as to by nonconducting by voltage divider $R_{18}$—$R_{19}$. Immediately after discharge, condenser $C_3$ is charged positively by current flowing through resistances $R_2$ and $R_7$, and]

*OPERATION*

*In the absence of a pulse from terminals 11, the thyratron $V_1$ is normally biased by voltage divider $R_{18}$–$R_{19}$ so as to be nonconductive. Because of condenser $C_3$ being connected between the positive distributor bus 22 and ground through resistors $R_2$ and $R_7$, a charge is maintained across condenser $C_3$ of such polarity that its upper terminal connected to anode 10d of thyratron $V_1$ through resistor $R_6$ is positive with respect to its lower terminal connected to cathode 10a, which is at ground potential. When a suitable trigger pulse derived from high tension lead of No. 1 cylinder, e.g., through terminals 11, is applied to the grid 10b of the thyratron $V_1$, the thyratron $V_1$ becomes conductive. The thyratron $V_1$ remains conductive until condenser $C_3$ has discharged through resistor $R_6$ and thyratron $V_1$ until the voltage thereacross is insufficient to maintain thyratron $V_1$ conductive. The thyratron $V_1$ then remains nonconductive until another trigger pulse is applied to grid 10b. In the meantime, the condenser $C_3$ is recharged* at a rate determined by the adjustment of tap 14 on selector control $R_2$. A sawtooth wave form $e_2$ is generated across condenser $C_9$ at the rate of one sawtooth per input pulse $e_1$ (FIG. 1) and the sawtooth slope is determined by the setting of cylinder selector $R_2$.

The sawtooth wave form $e_2$ is applied to the grid 20b of the high MU triode $V_2$ through the voltage divider $R_{11}$—$R_{12}$ from tap 15. The voltage divider $R_{11}$—$R_{12}$ biases tube $V_2$ in such a manner that tube $V_2$ remains nonconducting until the sawtooth has reached approximately two-thirds of its maximum value [near the point of maximum de/dt for a given time after initiation]. The positive *voltage* [de/dt] on the grid 20b of tube $V_2$, when t becomes conductive, together with the high MU of tube $V_2$ cause the plate 20c of tube $V_2$ to [rise to] *fall from* a value of approximately 250 volts [and to fall] to a minimum positive value of approximately 25 volts. *At the time that this drop in the voltage of plate 20c of tube $V_2$ takes place, the opposite terminals of condenser $C_4$ are at substantially the same voltage since one terminal is connected to resistance $R_8$ and the other terminal to either resistance $R_3$, $R_4$ or $R_5$. Since no appreciable current is flowing through either resistance $R_8$ or the selected resistance $R_3$, $R_4$ or $R_5$, while tube 20 is nonconductive, both terminals of condenser $C_4$ are at a relatively high voltage close to that of the positive distributor bus 22 and condenser $C_4$ is thus effectively discharged. Thus, when the plate voltage 20c of tube $V_2$ drops from 250 volts to approximately 25 volts, upon tube 20 becoming suddenly conductive, this rapid decrease in voltage is transferred to the grid 23b of high MU tube 23, causing nonconduction of the latter. Unitl this pulse is applied to grid 23b, tube $V_3$ is fully conducting since the grid is held positive by any one of the selected resistances $R_3$, $R_4$ or $R_5$ by means of selector switch $S_1$ moving over contacts 24, 25 or 26. The rapid decrease in voltage of plate 20c when transferred to grid 23b causes nonconduction of tube $V_3$. At the same time, condenser $C_4$ charges through resistances $R_3$, $R_4$ or $R_5$ and tube $V_2$, again raising the potential of the right-hand terminal of condenser $C_4$. When the voltage on the right-hand side of condenser $C_4$ has risen by a predetermined amount, tube $V_3$ again becomes conductive.*

*When $V_3$ ceases to conduct, the voltage at the anode 23c thereof rises abruptly. As soon as it conducts again, the voltage falls. The result is that a voltage having a wave form shown in FIG. 1 at $e_4$ is produced at the anode 23c. The voltage $e_4$ is supplied through voltage divider $R_{13}$–$R_{14}$ to the control grid 28b of thyratron $V_4$. Thyratron $V_4$ thus conducts only when both tube $V_3$ is nonconducting as explained above and when a positive voltage is applied to the plate 28d of thyratron $V_4$.*

Figure 2:
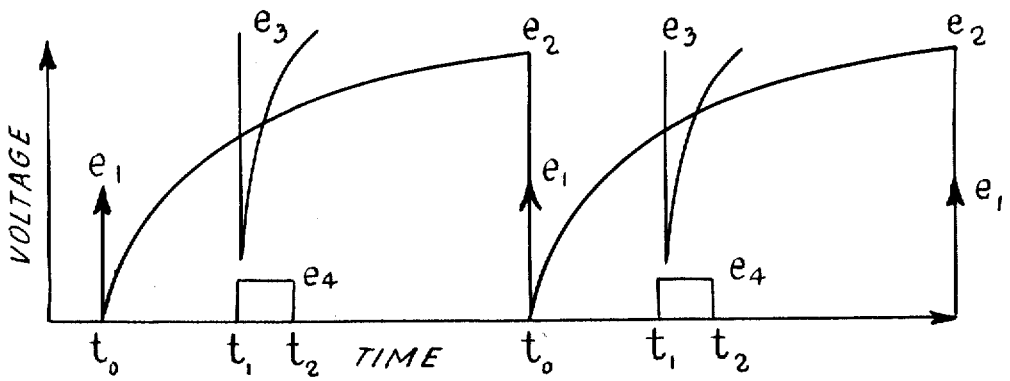
FIG. 2 is a view of the voltage waveforms at [the grid of one of the triodes of the trigger and time delay system of] *various points in the circuit as illustrated* in FIG. 1.

Referring to FIG. 2, the characteristic curves for the cycles of operation are shown. *FIG. 2 shows the relationships of these wave forms plotted with voltage as ordinates and time as abscissa.* At a time $t_1$ in the first part of curve [$e_3$] $e_2$, the time between $t_0$ and $t_1$ is determined by the setting of resistance $R_2$. [This rapid decrease in voltage transferred to the grid 23b of high MU tube 23 causes nonconduction. Tube $V_3$ is normally fully conducting since the grid is held slightly positive by any one of the selected resistances $R_3$, $R_4$ or $R_5$ by means of selector switch $S_1$ moving over contacts 24, 25, or 26. Nonconduction continues until condenser $C_4$ discharges through resistances $R_3$, $R_4$, or $R_5$ to a point at which tube $V_3$ again conducts at a time $t_2$, as indicated in FIG. 2. The time between $t_1$ and $t_2$ is thus determined by the ratio of R/C] *Curve $e_3$ in FIG. 2 shows the rapid decrease in voltage on the right-hand side of condenser $C_4$ when tube 20 becomes conductive, this rapid decrease occurring at time $t_1$. Curve $e_3$ in FIG. 2 also shows the voltage rapidly rising again. At the time $t_2$ in FIG. 2, the voltage depicted by curve $e_3$ has risen to a value at which tube $V_3$ again conducts. The time between $t_1$ and $t_2$ is thus determined by the RC* of condenser $C_4$ and resistances $R_3$, $R_4$, or $R_5$. [The voltage wave forms at the grid 23b of tube $V_3$ are indicated in FIG. 1 at $e_3$, while the voltage wave forms at the plate 23c of tube 23 are indicated at $e_4$ in FIG. 1. FIG. 2 shows the relationships of these wave forms plotted with voltages as ordinates and time as abscissa. The voltages $e_4$ are supplied through voltage divider $R_{13}$–$R_{14}$ to the control grid 28b of thyratron $V_4$, the voltage divider normally biasing the thyratron to be nonconducting. Thyratron $V_4$ thus conducts only when both tube $V_3$ is nonconducting between times $t_1$ and $t_2$ indicated in FIG. 2, and when a positive voltage is applied to plate 28d. Application of a positive voltage to the plate 28d of thyratron $V_4$ makes the thyratron conductive only at times between $t_1$ and $t_2$. The times are selectable by cylinder selector 14 and the differential $t_1$–$t_2$ is selectable by switch $S_1$.] *The voltage wave form $e_4$ which determines the time the thyratron $V_4$ is conductive is also shown in FIG. 2. It will be apparent from this curve that the thyratron $V_4$ is conductive between times $t_1$ and $t_2$, as long as a positive voltage is applied to the anode 28d of thyratron $V_4$. The timing between points $t_1$ and $t_2$ is selectable by cylinder selector $R_2$ and by switch $S_1$, cylinder selector $R_2$ determining the slope of the voltage wave $e_2$ and switch $S_1$ determining the slope of the rising portion of the voltage $e_3$. The time $t_0$–$t_1$ can be set to correspond to the time between the firing of the No. 1 plug and that at which any of the other plugs would normally fire. By selecting the time $t_0$–$t_1$, any particular plug may be disabled by causing the thyratron $V_4$ to become conductive at the time that the points would open to cause firing of that particular plug.*

[Referring particularly to the #1 cylinder trigger, the thyratron $V_4$ only conducts at times immediately after opening of points, and when the grid is not negative. Hence, when] *When* $t_1$–$t_0$ is set to equal one engine cycle, i.e., the time between successive #1 cylinder firings, [since] normal trigger is present only on even cylinder firings, and not on odd firings. *As explained above, this is due to the fact that the shorting of the No. 1 plug one engine cycle later removes the pulse which would otherwise be supplied by that plug so that during the following cycle, thyratron $V_4$ would not fire.* The conduction current of thyratron $V_4$ on odd cylinder firings, however, also flows through the primary winding 29 of transformer $T_2$, causing a trigger pluse to be generated in the secondary winding 30 on these odd firings. When the switch $S_4$ is closed this self-generating trigger pulse can thus be used *to fire thyratron $V_1$ during the even cycles, as previously explained,* to cause thyratron $V_4$ to conduct on both even and odd #1 cylinder firings.

The controls which have heretofore been described may be summarized as having the following functions:

$R_2$—(Cylinder selector). Adjusts time delay between trigger pulse and thyratron conduction—thus selecting cylinder which is shunted.

$S_1$—(Number of cylinders selector). Permits selection of time period $t_2$–$t_1$ *during which* thyratron $V_4$ can conduct. For four-cylinder engines this, for example can be made twice as long as for an eight-cylinder engine, thus requiring no change of adjustment of $R_2$ for greater change in r.p.m. of four-cylinder engines *when a cylinder is effectively disabled* as compared to [eight-cylinder disabled] *the change in r.p.m. when a cylinder of an eight-cylinder engine is effectively disabled. This is due to the fact that when one cylinder of a four-cylinder engine is effectively disabled, one-fourth of the cylinders are effectively disabled whereas in the case of an eight-cylinder engine, only one-eighth of the cylinders are effectively disabled.*

$S_3$—(Polarity selector). Permits operation with either polarity at breaker points.

$S_4$—Permits shunting of particular cylinder from which basic trigger is obtained.

$S_5$—Completely removes shunting action [or] *of* circuitry regardless of setting on all other controls.

The system of my invention may be embodied in many types of circuits and assemblies. For example, there may be provided a variety of forms of point shunting units, synchronizing units, in various applications as follows:

(A) Types of point shunting units (1) Thyratrons:
Single to double (with and without transformer).
Hot and cold cathode.
(2) Vibrator driven points
(3) Coil driven points (B) Types of synchronizing units (1) Time delay type:
(a) Thyratron—hot and cold cathode.
(b) Hard tube.
(c) Gas tube—other than thyratron.
(d) Electro mechanical—thermal, i.e., agastat-blinkers.

(C) Areas of application (1) "Standard" combustion engines.
(2) Fuel injection engines.
(3) Diesel (shunting is non-electrical).

Figure 3A:
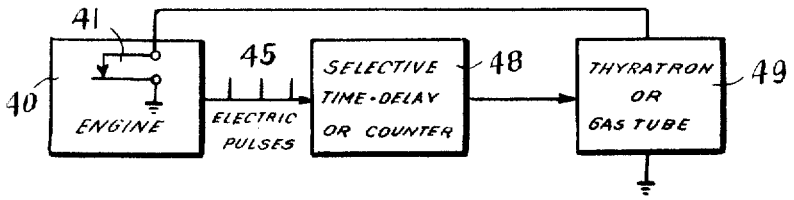
FIGS. 3a and 3b are diagrammatic views of modified systems using various types of point shunting and synchronizing units.
Figure 3B:
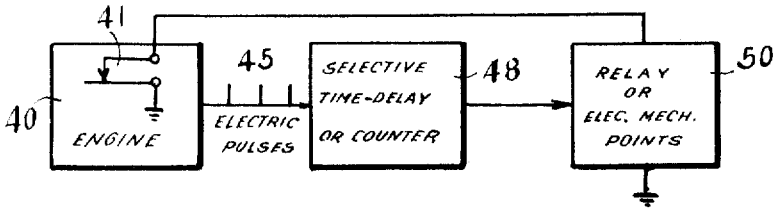

Referring to FIGS. 3a and 3b, there are shown two examples employing the system and method of my invention.

In FIG. 3a the system of my invention employs an adjustable time delay or counting system 48, connected with a thyratron or gas tube indicated at 49, which is coordinated in operation with the ignition circuit 41. In this figure the combustion engine is indicated generally at 40, including the ignition circuit broadly indicated at 41, comprising alternately selective primary and secondary elements shunted to ground. *In this arrangement, the counting system 48 causes the thyratron to be conductive to disable the ignition circuit after a predetermined number of pulses.*

In FIG. 3b there is shown an application of my invention to a system embodying the adjustable time delay circuits or counting system 48, but used in connection with a relay system or electro-mechanically operated points. The relay system or the like is generally indicated at 50.

Figure 4:
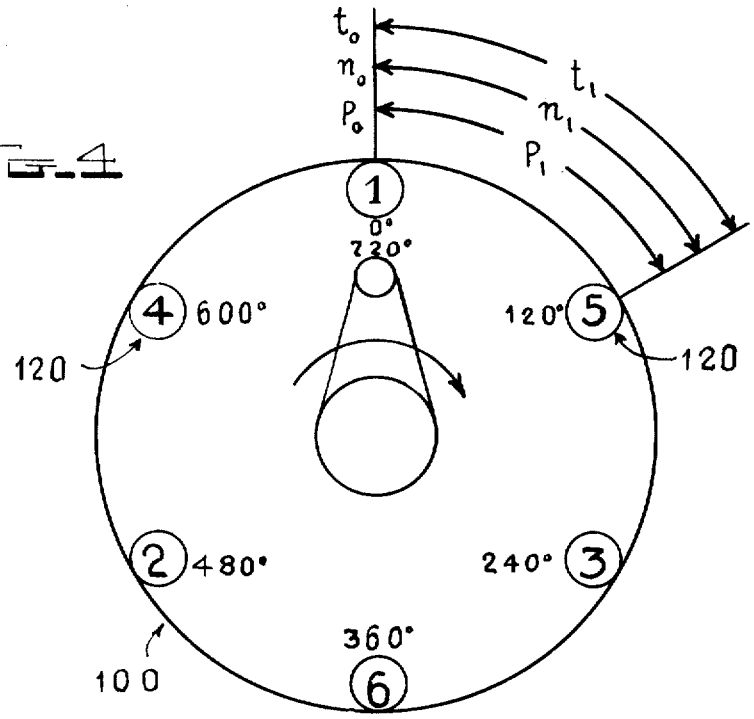
FIG. 4 is a diagrammatic representation of the relation between engine crankshaft position and "phase," "time," and "count" [.] , *shown illustratively in a six-cylinder, four-cycle engine.*

Referring to FIG. 4, which is a schematic view of the system 100 *in a six-cylinder engine,* the relative position of engine crank shaft and the ignition events relative to "time," "count," and "phase" angle, are shown for one complete engine cycle. Time, count, and phase angle at the start of the cycle are represented by the symbols t, n, and p, respectively. The symbols $t_1$, $n_1$, and $p_1$ are time, number and phase angle at the first ignition event. At any speed, $n_1$ is one (1), and $p_1$ is 120° (crankshaft) *for four-cycle engines.* The value of $t_1$ will depend upon engine speed at 100 r.p.m. $t_1$=20 milliseconds). Integral multiples of the parameters shown can be used to sense electronically the disabling function for a selected cylinder or cylinders. The cylinder numbers 120 at the periphery identify their relative position in the engine and not their order of firing, which order is apparent from the clockwise arrangement on the schematic. For example, cylinder #6 is the fourth to fire in the engine cycle etc.

Both phase (p) and number or count (n) are not affected by engine speed whereas time (t) is inversely proportional to speed. Ipso facto, devices employing phase and counting as selective means for disabling are independent of engine speed, time measurement devices, on the contrary, being sensitive to the speed of the engine.

While I have shown and described a preferred embodiment of my invention, it will be appreciated that other combinations of apparatus may be employed in carrying out the method of my invention, and I wish it to be understood that I do not confine myself to the precise details of the arrangement set forth herein by way of illustration, as it is apparent that many changes and variations may be made therein, by those skilled in the art, without departing from the spirit of the invention or exceeding the scope of the appended claims.

What is claimed is:

1. In portable analyzing systems for multi-cylinder spark plug ignition internal combustion engines, a universally applicable method of testing relative performance of each cylinder of an operating engine including the steps of: applying a source of power to the analyzing system; electrically connecting the analyzing system to a common coil-distributor terminal, one spark plug cable and ground; *deriving from the connection to said one spark plug cable a triggering pulse;* setting cylinder disabling action time interval relative to the number of cylinders and the engine testing speed; thereafter running the engine at a predetermined fixed throttle opening; selecting the absolute time interval between the firing of said one spark plug *from which said triggering pulse is derived* and the firing of the spark plug which is to be selectively *disabled, then selectively* disabling electronically one or more at a time, all cylinders of the engine; simultaneously measuring the change, if any, of one or more of the engine parameters as each one or more of said cylinders is disabled; and simultaneously identifying the measurement with said specific cylinder or cylinders so disabled.

2. The method according to claim 1 including the step of compensating for polarity of the ignition system following setting disabling action time control.

3. Portable apparatus for analyzing multi-cylinder internal combustion engines generating ignition pulses, comprising a source of electrical energy; conductive means connecting apparatus to a common coil-distributor terminal, any one spark plug circuit and ground, said apparatus including in connection: an electronic cylinder disabling circuit having a high impedance state and a low impedance state; a first electronic timing circuit for predetermining the duration of the low impedance state; a second electronic timing circuit for determining the interval between the firing of said spark plug and the start of low impedance state of the cylinder disabling circuit, the time duration of which has been predetermined by the first electronic timing circuit, said second electronic timing circuit being triggered from said conductive connection to a spark plug circuit, whereby the low impedance state of said cylinder disabling circuit selectively, by means of the second electronic timing circuit, disables one or more engine cylinders through the common coil-distributor, terminal connection and ground making possible a determination of the relative contribution of said one or more cylinders to overall engine performance.

4. Apparatus according to claim 3 further comprising means associated with said second timing circuit for cylinder identity.

5. Apparatus according to claim 3 further including cylinder identifying means common to said apparatus in the form of oscillographic presentation of engine ignition signal.

6. Apparatus according to claim 3 including torque indicating means in combination to determine relative contribution of said one or more cylinders.

7. Apparatus according to claim 3 including engine horsepower indicating means in combination to determine relative contribution of said one or more cylinders.

8. Apparatus according to claim 7 including manifold vacuum indicator means in combination to determine relative contribution of said one or more cylinders.

9. Apparatus according to claim 7 including engine speed measuring means in combination to determine relative contribution of said one or more [cyliders] *cylinders.*

10. Apparatus according to claim 3 including ignition system polarity compensating means.

11. Apparatus according to claim 10 including cylinder identifying means common to said apparatus in the form of oscillographic presentation of engine ignition signal.

12. Apparatus according to claim 10 including engine horsepower indicating means in combination to determine relative contribution of said one or more cylinders.

13. Apparatus according to claim 10 including engine speed measuring means in combination to determine relative contribution of said one or more cylinders.

14. Apparatus according to claim 10 in which manifold vacuum indicator means is combined to determine relative contribution of said one or more cylinders.

15. Apparatus according to claim 10 in which torque indicating means is combined to determine relative contribution of said one or more cylinders.

[16. Apparatus according to claim 14 including ignition system polarity compensating means.]

17. Apparatus according to claim 4 in which the cylinder disabling circuit is a thyratron circuit.

[18. Apparatus according to claim 10 in which the cylinder disabling circuit is a thyratron circuit.]

*19. The method according to claim 1 including the step of deriving from the disabling action a further pulse which is employed as a triggering pulse when said one spark plug is disabled.*

*20. Apparatus according to claim 3 further comprising means associated with said electronic cylinder disabling circuit for deriving a triggering voltage which is applied to said apparatus to cause operation of said cylinder disabling circuit when said one spark plug to which said conductive connection is made is disabled.*

References Cited by the Examiner

The following references, cited by the Examiner, are of record in the patented file of this patent or the original patent.

UNITED STATES PATENTS

| | | | |
|---|---|---|---|
| Re. 23,150 | 9/1949 | Sexton | 73—116 |
| 2,608,093 | 8/1952 | Traver | 73—116 |
| 2,652,727 | 9/1953 | Richardson et al. | 73—398 |
| 2,809,344 | 10/1957 | Mayer et al. | 324—19 |
| 2,842,956 | 7/1958 | Uyehara et al. | 73—116 |

RICHARD C. QUEISSER, *Primary Examiner.*

ROBERT EVANS, *Examiner.*

C. A. CUTTING, JERRY W. MYRACLE, *Assistant Examiners.*